United States Patent [19]
Dolezalek et al.

[11] 4,451,497
[45] May 29, 1984

[54] PROCESS FOR THE PRETREATMENT OF PHOTOGRAPHIC SUBSTRATES

[75] Inventors: Friedrich Dolezalek, Groebenzell; Günther Koepke, Odenthal; Ulrich Rendelmann, Leverkusen, all of Fed. Rep. of Germany

[73] Assignee: Agfa-Gevaert Aktiengesellschaft, Leverkusen, Fed. Rep. of Germany

[21] Appl. No.: 410,137

[22] Filed: Aug. 20, 1982

[30] Foreign Application Priority Data

Sep. 1, 1981 [DE] Fed. Rep. of Germany ....... 3134615

[51] Int. Cl.³ .......................... C03C 1/74; B05D 7/04; B05D 3/06
[52] U.S. Cl. ......................................... 427/39; 427/40
[58] Field of Search .................................... 427/39, 40

[56] References Cited
U.S. PATENT DOCUMENTS
3,531,314 9/1970 Kerr et al. ...................... 118/324 X
3,761,299 9/1973 Lidel .................................. 427/42 X Primary Examiner—James R. Hoffman
Attorney, Agent, or Firm—Connolly and Hutz

[57] ABSTRACT

In a process for the pretreatment of photographic substrates in order to improve adhesion during subsequent coating with photographic emulsions, the corona discharge is carried out under a reduced pressure in order to treat the substrate, resulting in an improvement in the adhesion and wettability which lasts over a long period as well as a reduction in the residual charges generated or left on the substrate by the corona discharge.

6 Claims, 7 Drawing Figures

PROCESS FOR THE PRETREATMENT OF PHOTOGRAPHIC SUBSTRATES

The invention relates to a process and an apparatus for the pretreatment of photographic substrates in order to improve the adhesion during the subsequent coating with photographic emulsions, in which the photographic substrates are exposed to corona discharge.

During the production of photographic materials, hydrophilic layers are applied to plastic substrates which consist entirely of plastic or in which plastic films are applied to a photographic paper substrate to prevent liquids penetrating the paper substrate. However, layers which are hydrophilic, including the photographic silver halide gelatine emulsions, do not adhere to the hydrophobic surface of plastic substrates.

It is known that adequate adhesion of a hydrophilic layer to the surface of a substrate, consisting for example of a polymer, can be achieved if the surface is activated by treatment with a strong corona discharge prior to the coating with photographic emulsions. This process for obtaining the necessary adhesion between the photographic emulsion to be applied and the substrate can be carried out simply and can also be implemented at high speed. However, it has been found that the process has a considerable disadvantage. The films or photographic papers produced by the process display, after development, cloudiness in the image which becomes more marked if the substrate is provided with an electrically conducting material (antistatic material) in order to avoid charges during the production and processing of the photographic material.

German Auslegeschrift No. 1 923 724 (U.S. Pat. No. 3,531,314) discloses a process for the coating of a substrate having a surface composed of a polymer, in which high charges of the same sign are applied after activation of the surface by corona discharges on both sides of the web. This should reduce the potential differences caused by corona discharge in the surface charges in various regions of the surface to such an extent that the irregularities in the finished product, in particular the visible transverse lines in the photographic recording material, are slighter and disappear completely if the potential differences fall below a lower limit value of approximately 100 volts.

With the process according to U.S. Pat. No. 3,531,314, it is possible to reduce and also balance the surface charge differences by means of a high charge of the same sign, but the high charge remains on the web and can give rise to considerable difficulties during further processing in a coating device or when winding the web into a roll, particularly since webs which are charged in this way have a strong tendency to discharge or to attract dust.

German Offenlengungsschrift No. 1 954 284 (U.S. Pat. No. 3,761,299) discloses a process for altering the surface wetting and adhesion properties of polymeric moulding compositions in which the material is treated without corona discharge in the electromagnetic field of at least 10 Megahertz (radio frequency energy) with a gas stream in a vacuum vessel at 0.01 to 20 mm Hg pressure. In addition to the permanent improvement in the water-wettability, this treatment causes a marked reduction in the tendency of hydrophobic polymeric moulding compositions to retain static charges.

However, the process has the considerable disadvantage that it is extremely ineffective when carried out at normal pressures, as the majority of the radio frequency energy is converted into thermal energy at such pressures. Pressures of 0.01 to 20 mm Hg and preferably pressures of 0.01 to 0.8 mm Hg are therefore adopted. The continuous implementation of such a process under fine or coarse vacuum conditions necessitates considerable production costs, however, as the treatment chamber just described cannot be sealed without damaging the material to be treated and a significant amount of external air enters the chamber if continuous processing is carried out. High energy consumption is needed for eliminating the air leakage and the maintenance of the gaseous atmosphere in the vacuum of the treatment device, and a uniform treatment is rarely possible.

The object of the invention is to provide a process and an apparatus of the type mentioned at the outset which permits, in a simple, rapid and economical manner, the surface wetting and adhesion properties of photographic substrates to be improved so that the materials can be cast with photographic emulsions without significant electrostatic residual charges remaining on the surface of the substrate and leading to a casting of poor quality.

This object is achieved according to the invention with a process of the type mentioned at the outset, in which corona discharge is carried out at reduced pressure. The reduced pressure at which corona discharge is carried out is from 100 to 1000 mbar, preferably from 500 to 900 mbar, below atmospheric pressure, the intensity of treatment amounting to between 50 and 1000 W.min per m$^2$ of substrate.

It has surprisingly been found that a corona treatment of substrates produces better adhesion and wetting properties, even at a low reduced pressure, than the formerly used corona treatment at normal pressure. Moreover, it was surprisingly that no significant electrostatic residual charges appeared on the substrate after leaving the treatment station, and the substrate could be coated with photographic silver halide gelatine emulsions without the appearance of flecks. The plasma treatments known hitherto from the prior art, in which the product to be treated is brought into a sealed chamber in which a gas discharge is maintained so that the gas discharge plasma touches the product to be treated directly, operate in pressure ranges of 0.01 to 20 mbar absolute. On the other hand, the pressure range above 100 mbar absolute is of particular commercial interest as the mechanical costs and the energy consumption for pumping out the air leakage is much lower, while the electrostatic residual charges are considerably reduced and the adhesion and wetting properties considerably improved.

Another advantage of the process lies in the fact that the web which is activated by the process according to the invention can be cast immediately after the treatment with very sensitive coloured silver halide gelatine emulsions and the substrate can be processed continuously in one operation in one machine into a finished colour film or colour paper.

As demonstrated by experiments, the web material which is treated according to the invention with corona discharges in the reduced pressure range can surprisingly be stored over a prolonged period and then cast with photographic colour emulsions without the wetting and adhesion properties being impaired and the quality of the casting being adversely affected by fleck formation. The normal activation with corona discharges at normal pressure formerly had the disadvantage that the activation was not sufficient even after a few days to achieve sufficient adhesion of gelatine emulsions on the substrate, whereas the substrates treated according to the invention still had a readily wettable surface after a year.

The process is advantageously carried out in such a way that the corona discharge device is charged at a frequency of 1 to 150 KHz, preferably 15 to 40 KHz. Mains frequency corona discharges of 40 to 60 Hz are known to be particularly unstable and necessitate a considerably longer treatment time for non-conducting substrates than the stable corona discharges in the KHz range which demonstrate good results even after very short treatment times.

The process of the invention can be effectively applied, for example, to polyesters such as, for example, polyethylene terephthalate, polybutylene terephthalate; polyolefins, such as, for example, polyethylene, polypropylene; polystyrenes such as, for example, polystyrene, poly-$\alpha$-methyl styrene; acrylesters such as, for example, polymethylmethacrylate; polycarbonates; cellulose derivatives such as, for example, cellulose triacetate, cellulose acetate butyrate and the like.

The process according to the invention is particularly advantageous if it is used for a paper coated with these polymers, the substrate containing an electrically conducting, antistatically acting agent which is incorporated into the paper substrate or applied to the surface of the paper and being coated with a polymer layer containing the above-mentioned polymers.

The process not only allows savings in cost and energy since the photographic emulsions which are particularly sensitive against undesirable effects such as, for example, gelatine silver halide emulsion with couplers are applied to the activated base films in one operation, but also, as a continuous process, can be adapted extremely rapidly and to the desired machine speed of the casting apparatuses of 70 to 200 m/min, and yields a homogeneous substrate with the properties required for immediate or subsequent casting with colour emulsions for the production of a high quality colour film or colour paper. Adaptation to the machine speed can be effected in a simple manner by the choice of the radiation intensity and/or by the choice of the reduced pressure. The process can also be carried out in a special gaseous atmosphere, for example, under a protective gas or an active gas.

The object is achieved with regard to an apparatus for carrying out the process according to the invention, in that a treatment chamber with at least one corona discharge device is arranged along the path of the continuously moved substrate and the treatment chamber is subjected to a reduced pressure and is sealed from the atmospheric pressure, the treatment chamber being sealed from the atmospheric pressure by the substrate itself, blocking rollers and roller seals in an advantageous embodiment of the apparatus.

This relatively simple apparatus permits polymer surfaces to be treated with corona discharge in the reduced pressure range of 100 to 400 mbar below atmospheric pressure and good results to be achieved in a surprisingly simple manner.

In a further development, antechambers which are sealed on both sides and in which a reduced pressure lying between atmospheric pressure and the pressure in the treatment chamber can be generated are arranged in front of the treatment chamber on both sides, on the substrate inlet and outlet side.

By introducing the substrate step-wise into the reduced pressure of the treatment chamber, it is possible to reduce the problem of sealing the rollers and to minimize the necessary pumping operation. With this apparatus, a reduced pressure in the treatment chamber of 1000 to 400 mbar can be maintained without significant losses of reduced pressure, a reduced pressure of 600 to 500 mbar being maintained in the antechambers. If additional antechambers are arranged in front of the treatment chamber for the step-wise formation of a reduced pressure, a reduced pressure of 900 mbar can be generated in the treatment chamber without a significant loss of energy.

Another advantage of the apparatus lies in the fact that the energy consumption of the corona device is smaller at a reduced pressure than with a corona discharge at normal pressure, and no ozone enters the chamber, but rather is drawn off and discharged by the vacuum pumps. As the apparatus is sealed by sealing rollers, light generated by the corona discharge is unable to issue from the apparatus, so the apparatus can be arranged directly in front of the casting position for the casting of the substrate with light-sensitive photographic materials without causing preliminary exposure.

An embodiment of the invention is described in more detail below with reference to drawings.

Figure 1:
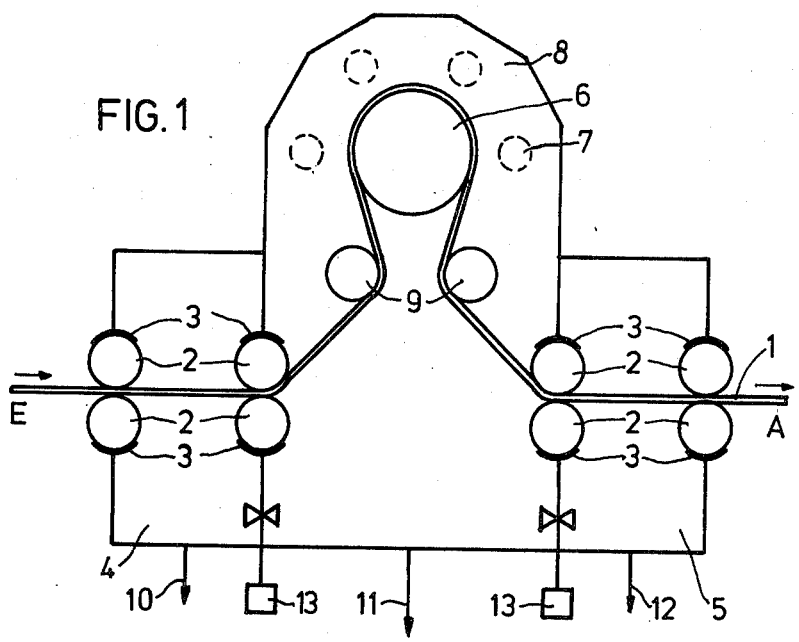
FIG. 1 shows an apparatus for carrying out a corona treatment in the reduced pressure range.

FIG. 1 shows an apparatus with a treatment chamber 8 for the continuous treatment of a substrate 1 in air-to-air operation with corona discharges at a reduced pressure with antechambers 4,5 arranged on both sides. The substrate 1, for example, a web of photographic film 1 consisting of a polymer having a width of 137 cm, is unwound from a roll and fed to the apparatus on the inlet side E and gripped by two rollers 2. The rollers 2 are sealed from their housing, the antechamber 4, by seals 3. The web of film 1 forms the seal between the rollers 2. The antechamber 4 is connected to a vacuum pump 10 which evacuates the antechamber to a reduced pressure of, for example, 400 mbar below atmospheric pressure. The web of film 1 passes from the antechamber 4 via additional rollers 2 sealed by seals 3 into the actual treatment chamber 8 subjected to a markedly reduced pressure and is fed directly or via deflecting rollers 9 to the treatment roller 6. At least one, or, as shown in FIG. 1, several corona discharge devices 7 are arranged around the treatment roller 6. Any conventional electrodes such as, for example, flat steel electrodes, roller electrodes, wire electrodes, quartz glass electrodes or quartz glass electrodes filled with aluminium granules can be used as corona discharge devices 7.

The web 1 which is activated with corona discharge under a reduced pressure and is freed from electrostatic charges is then brought via the deflecting roller 9 and the sealing rollers 2 from the treatment chamber 8 into the antechamber 5 charged with smaller reduced pressure and thence via rollers 2 to the outlet side A of the apparatus. On the outlet side A, the web 1 (arrow) can be slid directly into a coating station for coating purposes or can be fed to a winding apparatus (not shown). The reduced pressure in the antechambers 4,5 and in the processing chamber 8 can be maintained and controlled by separate vacuum pumps 10,11,12 as shown (arrows). However, it is also possible to maintain only the treatment chamber 8, controlled by a vacuum pump 11, at the desired reduced pressure and to allow the reduced pressure in the antechambers 4,5 to adjust itself, or to control it with adjusting members 13.

If a reduced pressure of 600 mbar below the normal pressure is desired in the treatment chamber 8, then a reduced pressure of approximately 400 mbar in the antechambers 4,5 is advantageous. As shown in the examples described below, the surface wettability and the layer adhesion depend both on the intensity of the corona discharge in $Wmin/m^2$ (FIG. 3) and on the reduced pressure in the treatment chamber (FIG. 2), whereas the discharges of the substrate surface (FIG. 2) which are caused by the corona discharge on the substrate and lead to coating defects decrease visibly even at a reduced pressure of 100 mbar below normal pressure and no longer affect the quality of the casting at 400 mbar reduced pressure. For greater reduced pressures, for example of 900 mbar, it is advantageous for reasons of vacuum technology to place an additional reduced pressure antechamber in front of the respective antechambers 4 and 5 to produce reduced pressure stages of 400, 600, 900, 600, 400 mbar in the individual chambers. The leakages through the seals are then considerably smaller than with excessively large pressure steps.

The dependence of the difference in the maximum positive and negative charge of the coronized substrate as a function of the reduced pressure in mbar below normal pressure is plotted as a curve (volts) in FIG. 2. As shown by the curve, the charge difference exceeds 200 volts ($\pm 100$ volts) at 100 mbar reduced pressure and then falls steeply, a potential difference of only a few volts ($+8$, $-10$ volts) remaining at a reduced pressure of 800 mbar. In this example, the corona device was charged with a voltage of 30 kV at a frequency of 20 KHz. The corona discharge had an intensity of 130 $Wmin/m^2$ on the substrate. For higher corona intensities, the curve is approximately parallel, but higher, and correspondingly lower for lower intensities. A good quality casting can be achieved with the conventional colour emulsions containing couplers at a reduced pressure of 400 mbar corresponding to a voltage difference of 80 volts (Example 2). The quality of the casting is further improved, for example, by a treatment at a reduced pressure of 800 mbar below normal pressure (Example 3).

Figure 2:
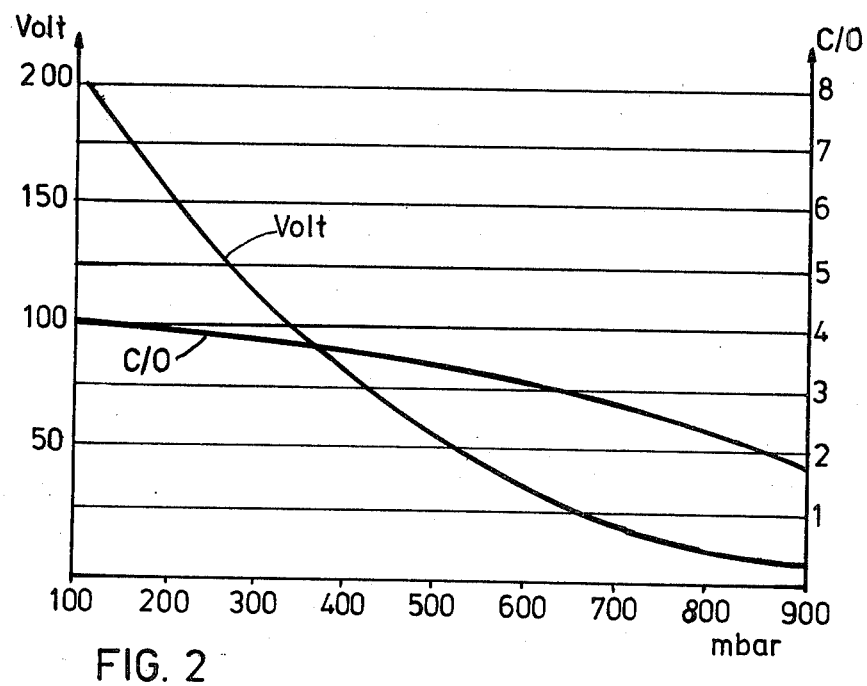
FIG. 2 shows the dependence of the residual charge (expressed in volts herein) and of the C/O value on the reduced pressure.

The second curve in FIG. 2 shows the C/O value, that is to say the carbon to oxygen ratio on the polymeric surface of the substrate after the corona treatment, measured using a ESCA (electron spectroscopy for chemical analysis) spectrometer. The C/O value is a very reliable aid for obtaining a statement about the wettability and the adhesion of a layer of gelatine emulsion on a polymeric surface without any losses of coating. The method of measurement is described in the Journal de chimie physique (1978, 75, No. 6, pages 662–668) and very rapidly delivers reliable and accurate values which are more reliable than the formerly used known determinations of the wetting angle (WA), the wettability being evaluated by the wetting angle of a water droplet applied to the activated surface.

Figure 3:
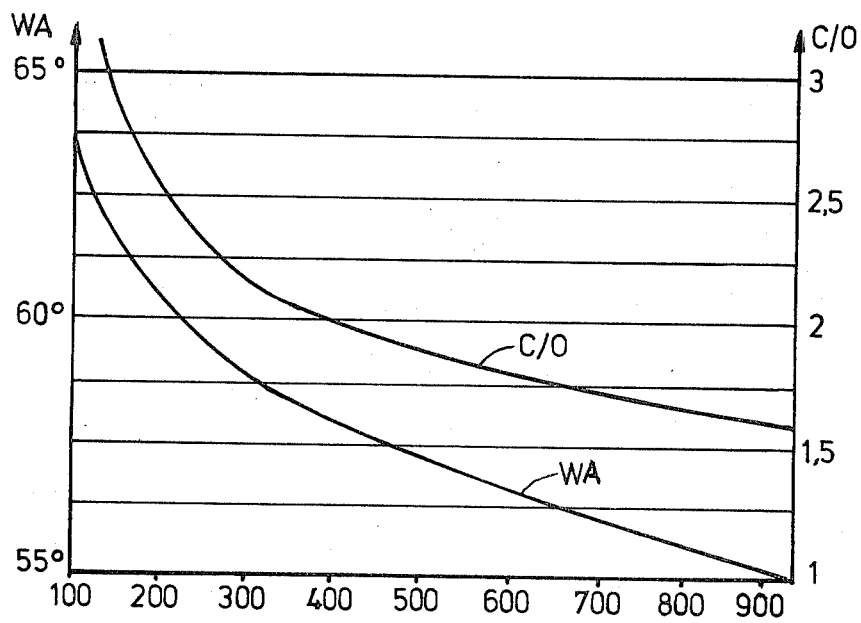
FIG. 3 shows the dependence of the C/O value and of the wetting angle (WA) on the radiation intensity (Wmin/m$^2$).

The curve of the C/O value (C/O) and the curve for the wetting angle (WA) is plotted as a function of the intensity of the corona discharge ($Wmin/m^2$) at normal pressure in FIG. 3 for one example. Experience has shown that surfaces having a wetting angle exceeding 65°, corresponding to a C/O value exceeding 4, display poor wettability and a layer adhesion. The C/O value shown in FIG. 2 is plotted as a function of the reduced pressure (mbar). As the reduced pressure increases, the carbon to oxygen ratio on the polymeric surface, the C/O value, decreases at the same corona intensity in $Wmin/m^2$ and the wetting properties of the surface are thus improved. The C/O value falls below a value of 4 at a reduced pressure of about 100 mbar below normal pressure, so that good wettability and good layer adhesion can be guaranteed. The voltage difference on the activated surface, which still lies in the critical range at 200 volts at 100 mbar reduced pressure and leads to casting defects, is responsible for the quality of the casting with respect to flecks, cloudiness and fog, so that a higher reduced pressure must be used for activation.

The advantages of the process and the apparatus should be illustrated below by three examples, Example 1 relating to a conventional corona treatment at normal pressure and Examples 2 and 3 to the process according to the invention with a corona treatment at reduced pressure.

EXAMPLE 1

A web of polyethylene-coated photographic paper provided with an internal antistatic layer was activated at normal pressure (0 mbar reduced pressure) by means of corona discharges and directly afterwards cast with a gelatine silver halide emulsion with a cyan coupler and tested. The treatment and the casting took place under the following conditions:

Web speed C=100 m/min

Corona treatment with 3 quartz glass electrodes filled with aluminium granules.

Voltage 30 kV

Frequency 20 kHz.

Intensity of the treatment 217 $W.min/m^2$.

Figure 4:
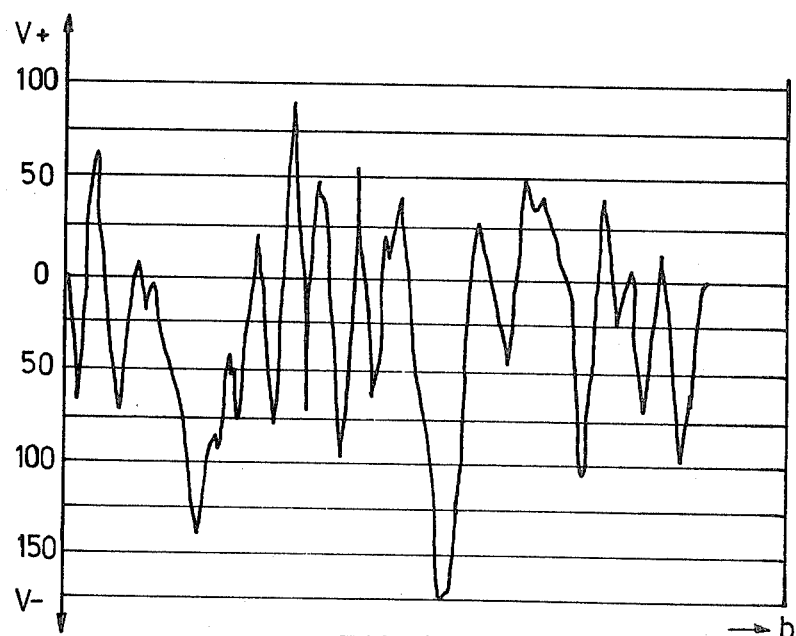
FIG. 4 shows the residual charge in volts of a substrate, exposed to a corona treatment at normal pressure.

The residual charge generated or left by the corona discharge on the web surface was measured using an influence probe (Type 244 made by Monroe Electronics Inc, 100 Housel Avenue, Lyndonville, N.Y., 140 98) on a sample of web of width b and plotted as a curve (see FIG. 4). The curve demonstrated marked variations in charge after positive and negative charging, the greater negative charges amounting to a maximum of $-175$ volts and the smaller positive residual charges $+88$ volts. The charge difference of 263 volts responsible for the quality of the casting was excessively high.

The samples coated with the emulsion and photographically developed exhibited a cyan layer having fleck-like light and dark points and were not suitable for high quality photographic paper.

The electrostatic toner images produced in a known manner from web samples exhibited a coarse texture which implied the presence of dense points having a large charge difference, as also shown in the curve in FIG. 4.

The C/O value was measured in the manner described above and was found to be 3.8 to 4. The adhesion of layers and the wettability were correspondingly good.

EXAMPLE 2

An identical web of photographic paper was treated in the same manner as in Example 1, but the treatment was carried out under a reduced pressure of 400 mbar below normal pressure. (C=110 m/min, V=30 kV, f=20 kHz, 3 identical electrodes).

As the corona discharge has a substantially more intensive effect at reduced pressure than at normal pressure, the intensity of treatment was adjusted to 130 $W.min/m^2$.

Figure 5:
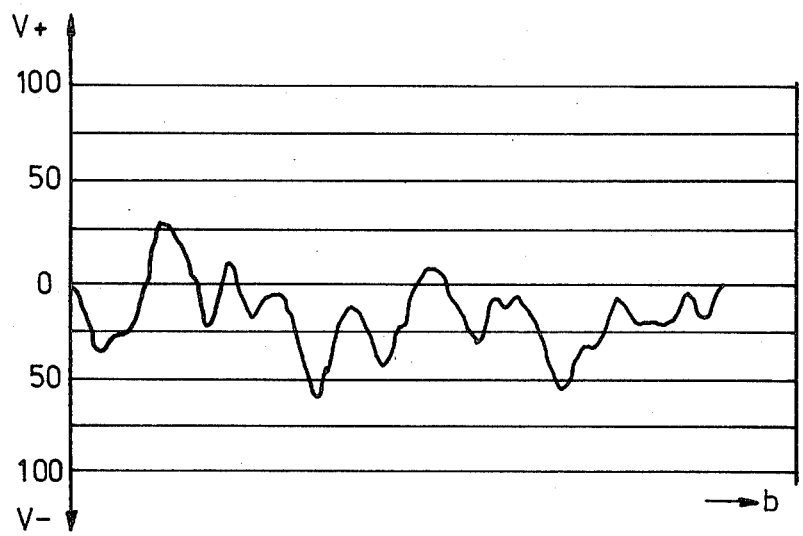
FIG. 5 shows the residual charge at a reduced pressure of 400 mbar.

The residual charge measured on the web surface was considerably reduced and was a maximum of −55 volts and +26 volts, so that the charge difference was 81 volts (see FIG. 5). The toner image displayed only a fine texture.

The samples developed were fleck-free and had no other defects. The C/O value measured was 3.5. Very good adhesion of dry and wet layers to the substrate was determined.

EXAMPLE 3

An identical web of photographic paper was treated as in Example 2, the reduced pressure being increased to 800 mbar (240 mbar absolute). The corona treatment intensity was further reduced to 85 $W.min/m^2$.

Figure 6:
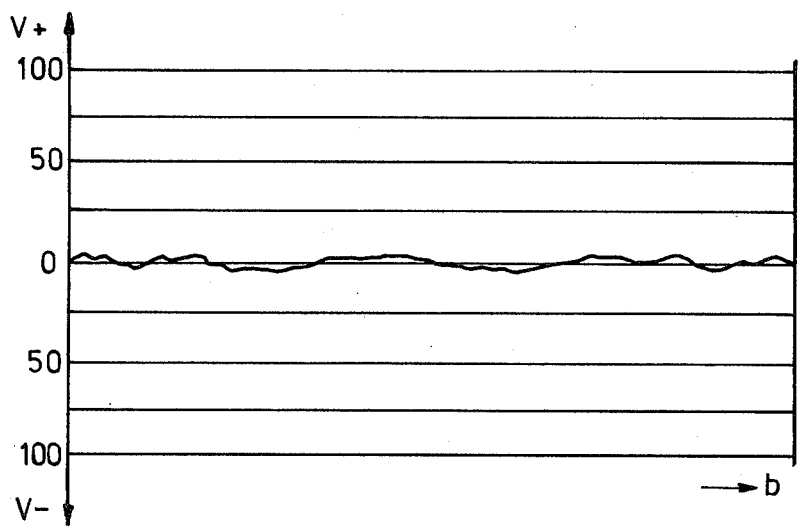
FIG. 6 shows the residual charge at a reduced pressure of 800 mbar.

The residual charges measured demonstrated a smoothened curve over the width of the web (b), as shown in FIG. 6. The residual charges were +8 volts and −10 volts, resulting in a charge difference of 18 volts maximum. The samples developed had a very good casting quality. The toner image was very uniform and exhibited only slight cloudiness. The C/O value measured was 2.4 and confirmed the excellent adhesion of layers already noted.

Figure 7:
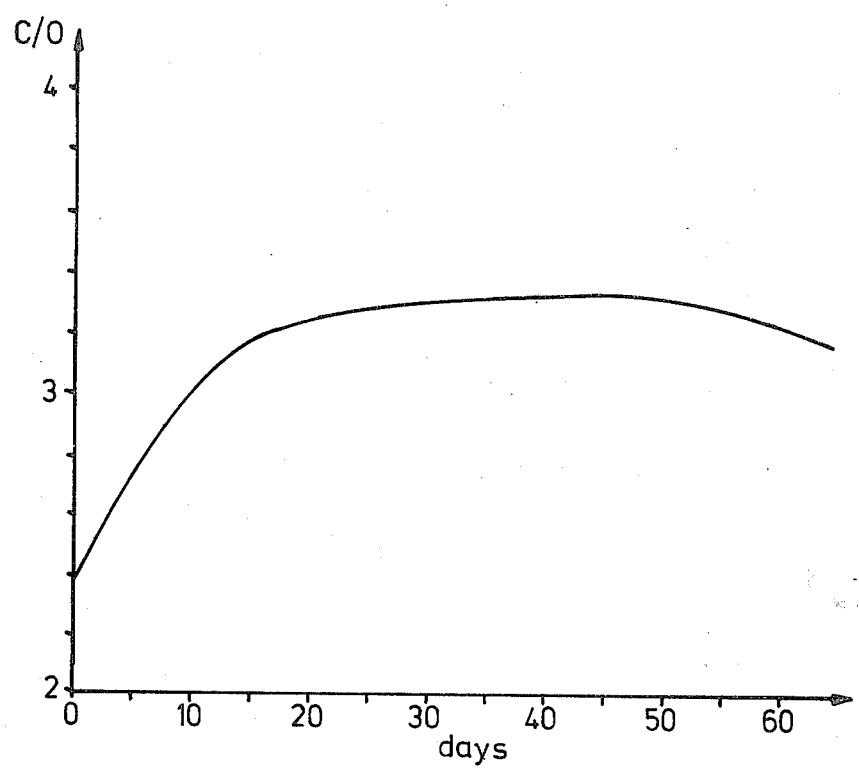
FIG. 7 shows the temporal behaviour of the C/O value of a reduced pressure-treated substrate.

A web produced in accordance with Example 3 was not cast after the treatment but wound into a roll in order to observe the change in the C/O value as a function of the storage time in days. Samples were removed from the web at regular time intervals and the C/O value measured. The surprising results are shown in FIG. 7. According to FIG. 7, the C/O value increases linearly in the first 10 days and attains a value of 3.1 from a starting value of 2.4. However, an approximately constant C/O value of 3.3 is then reached and begins to fall again after 50 days. This behaviour cannot be explained physically, but demonstrates at least that no tendency to increase can be observed. This assumption was confirmed on a sample measured after a year, which still had a C/O value of 3.2. The process according to the invention for corona activation under reduced pressure therefor also allows an activated web to be stored over a prolonged period without its wettability altering significantly, whereas the webs have poor wettability after only a few days after the conventional process at normal pressure and have to be reactivated.

We claim:

1. A process of preparing a substrate for a photographic emulsion to enhance adhesion of photographic emulsion to the substrate surface during subsequent coating with photographic emulsion wherein the substrate surface is treated to minimize electrostatic residual charge said process including the steps of passing the substrate web into a treatment chamber having a pressure reduced to from 100 to 1000 mbar below atmospheric pressure, wherein the web is first passed through means for maintaining the reduced pressure, exposing a surface of the substrate web in the treatment chamber to apparatus providing corona discharge to reduce electrostatic residual charge on the surface, and then passing the exposed substrate web through another means for maintaining the reduced pressure in the treatment chamber.

2. A process according to claim 1, characterised in that the corona discharge is carried out at a reduced pressure lying from 500 to 900 mbar below atmospheric pressure.

3. A process according to claim 1, characterised in that the selected intensity of treatment is between 500 and 1000 $W.min$ per $m^2$ of substrate.

4. A process according to claim 1, characterised in that the frequency selected from corona discharge is between 1 and 150 kHz.

5. A process as claimed in claim 1 wherein the frequency of the corona discharge is between 15 and 40 Khz.

6. A process as claimed in claim 1 including the steps of first passing the substrate web through a first antechamber having a pressure reduced below atmospheric pressure which is higher than the reduced pressure of the treatment chamber then passing the substrate web from the antechamber to the treatment chamber and further passing the exposed substrate through a second post-treatment of a reduced pressure higher than the reduced pressure of the treatment chamber.

* * * * *